US010285392B2

(12) United States Patent
Thomas

(10) Patent No.: US 10,285,392 B2
(45) Date of Patent: May 14, 2019

(54) FISHING TOOL

(71) Applicant: George Brent Thomas, Powhatan, VA (US)

(72) Inventor: George Brent Thomas, Powhatan, VA (US)

(73) Assignee: George Brent Thomas, Powhatan, VA (US)

( * ) Notice: Subject to any disclaimer, the term of this patent is extended or adjusted under 35 U.S.C. 154(b) by 0 days.

(21) Appl. No.: 15/923,312

(22) Filed: Mar. 16, 2018

(65) Prior Publication Data
US 2019/0082670 A1 Mar. 21, 2019

Related U.S. Application Data

(63) Continuation of application No. 14/876,944, filed on Oct. 7, 2015, now abandoned.

(51) Int. Cl.
*A01K 97/06* (2006.01)
*A01K 83/06* (2006.01)

(52) U.S. Cl.
CPC .............. *A01K 97/06* (2013.01); *A01K 83/06* (2013.01)

(58) Field of Classification Search
CPC ........ A01K 83/06; A01K 83/00; A01K 91/03; A01K 97/06; A01K 91/04; A44B 1/185; B25B 27/28; B25B 27/14
USPC .............................. 43/44.2, 44.8, 54.1, 4, 55
See application file for complete search history.

(56) References Cited

U.S. PATENT DOCUMENTS

| | | | | |
|---|---|---|---|---|
| 2,540,276 A * | 2/1951 | Moler | ..................... | A01K 83/00 43/44.2 |
| 3,114,984 A * | 12/1963 | Atton | ..................... | A01K 91/06 43/43.15 |
| 3,163,958 A * | 1/1965 | Quinn | ..................... | A01K 83/00 43/42.06 |
| 3,349,447 A * | 10/1967 | Raleigh, Jr. | ............ | A44B 1/185 24/114.7 |
| 3,491,477 A * | 1/1970 | Karras | ................... | A01K 91/03 24/600.6 |
| 3,863,383 A * | 2/1975 | Lore | ....................... | A01K 83/06 43/41 |
| 3,872,570 A * | 3/1975 | Crosa | ..................... | B25B 27/14 29/267 |
| 5,078,484 A * | 1/1992 | Vaughn | ................... | A44C 1/00 351/158 |
| 5,105,575 A * | 4/1992 | Robertaccio | ........... | A01K 85/00 43/42.37 |
| 6,105,468 A * | 8/2000 | Fohrman | ................... | B67B 7/44 81/3.09 |
| 7,228,770 B2* | 6/2007 | Rozo | ......................... | B25B 7/02 81/418 |
| 7,788,844 B1* | 9/2010 | Ruzicka | ................ | A01K 91/04 43/54.1 |
| 8,635,805 B1* | 1/2014 | Schmunk | ............... | A01K 97/04 206/540 |
| 9,487,318 B1* | 11/2016 | Catlin | ..................... | B25B 27/02 |

(Continued)

*Primary Examiner* — Magdalena Topolski

(57) ABSTRACT

A fishing tool may be used for securing a trailer hook or other lure item onto a bait hook. The tool includes a handle with a mounting end positioned therein, wherein the mounting end includes an installation hole that extends through the handle. There is additionally a recessed seat in the hole and around the perimeter of the hole. A plastic disc has an outside diameter that corresponds to the diameter of the installation hole.

10 Claims, 10 Drawing Sheets

(56) References Cited

U.S. PATENT DOCUMENTS

2005/0257073 A1\* 11/2005 Shay ................. A01K 83/00
  43/43.16
2007/0089569 A1\* 4/2007 Hernandez, Jr. ......... B67B 7/16
  81/3.09
2016/0302399 A1\* 10/2016 Sakellaropoulos .... A01K 83/06

\* cited by examiner

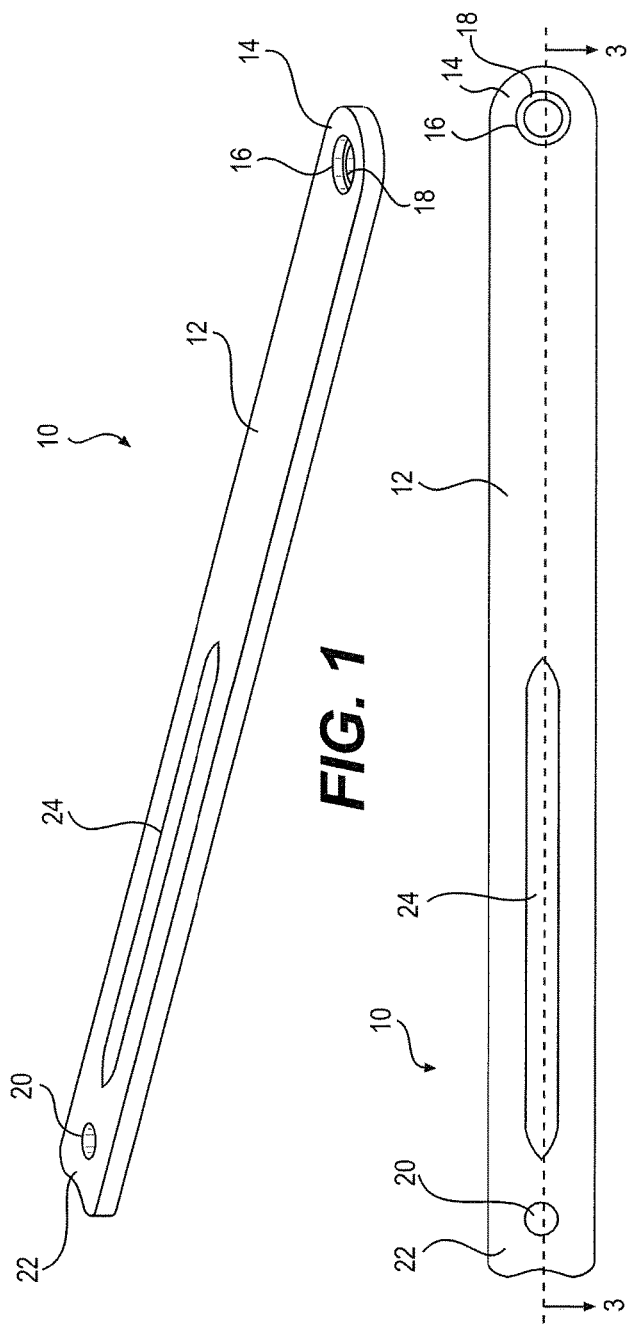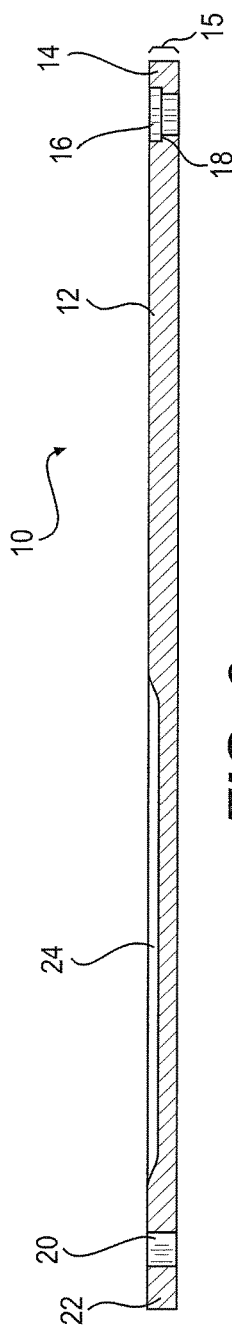

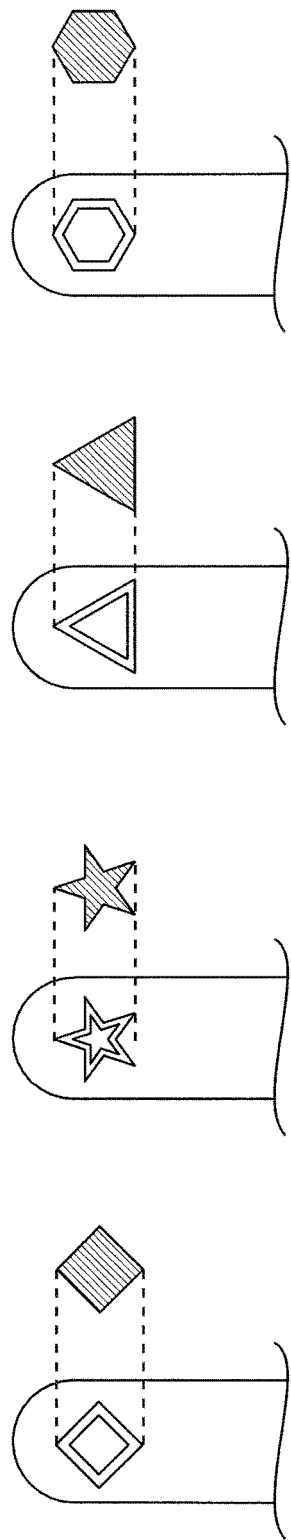

FISHING TOOL

This application claims the benefit of U.S. Provisional Patent Application No. 62/117,993, filed Feb. 19, 2015, incorporated by reference herein it its entirety.

A mounting tool is used to secure a plastic disc over a bait hook wherein the plastic disc secures a trailer hook or other lure component unto the bait hook.

BACKGROUND

Many types of spinning baits are used by fisherman in the United States and around the world to catch a wide variety of fish for sport and food. In order to improve their catch, many fishermen use a second, trailer hook in addition to the spinning bait and hook that the fisherman is already using. Sometimes, a trailer hook is permanently mounted onto a spinning bait hook, for instance as manufactured at a factory. However, it is common for many fishermen to use a trailer hook for only a short period of time. The trailer hook may be mounted and unmounted from the spinning bait hook. Temporary trailer hook mounting systems may include the use of plastic tubing and pliers to mount and unmount a trailer hook. It is not uncommon for a fisherman to inadvertently stick the trailer hook or bait hook in one of their fingers during the mounting or dismounting process. Needless to say, this can be very painful.

There is additionally a need to specifically locate a plastic worm or other lure component, live or artificial, on a hook. Sometimes the lure can be jerked around in normal use and either fall off a hook or be moved to a less effective location on the hook.

SUMMARY

Accordingly, it is an object of the present invention to overcome the foregoing drawbacks with respect to the placement of a trailer hook or other lure component onto a bait hook.

In one example, a fishing tool for securing a lure component on a bait hook comprises a handle having a mounting end positioned therein. The mounting end includes an installation hole that extends through the handle and recessed seat in the hole and around the entire inside perimeter of the hole. A plastic disc has an outside diameter that corresponds to and is substantially the same as the diameter of the installation hole. The installation hole may be round in shape. Alternatively, it may have a shape selected from the group consisting of rectangular, triangular, star, hexagonal and octagonal. The recessed seat may be round in shape. The tool may further comprise a plurality of installation holes in the handle and extending through the handle with each having a recessed seat therein. Each of the plurality of installation holes may be round in shape and may be different in size from the other installation holes. The plastic disc may be made of polyethylene and may have printed indicia thereon.

In another example, a method of securing a trailer hook onto a bait hook includes the steps of providing a bait hook having a barb thereon and a trailer hook having an eyelet. A fishing tool as described herein is provided. The eyelet of the trailer hook is placed over the barb of the bait hook and onto the bait hook. A plastic disc is then placed into the seat at the mounting end of the tool. The disc is then placed over the barb of the bait hook and pressed so that the bait hook barb pierces the plastic disc and the disc is positioned on the bait hook. The tool is then pulled away and off of the bait hook, whereby the trailer hook is retained on the bait hook by the plastic disc.

BRIEF DESCRIPTION OF THE DRAWINGS

FIG. 1 is a perspective view of an example of a fishing tool described herein.

FIG. 2 is a top view of the fish tool shown in FIG. 1.

FIG. 3 is a side cross-sectional view taken along lines 3-3 of the fishing tool shown in FIG. 2.

FIGS. 13A-D are top views of alternative installation hole and plastic disc shapes that may be used as described herein.

DETAILED DESCRIPTION

Figure 4:
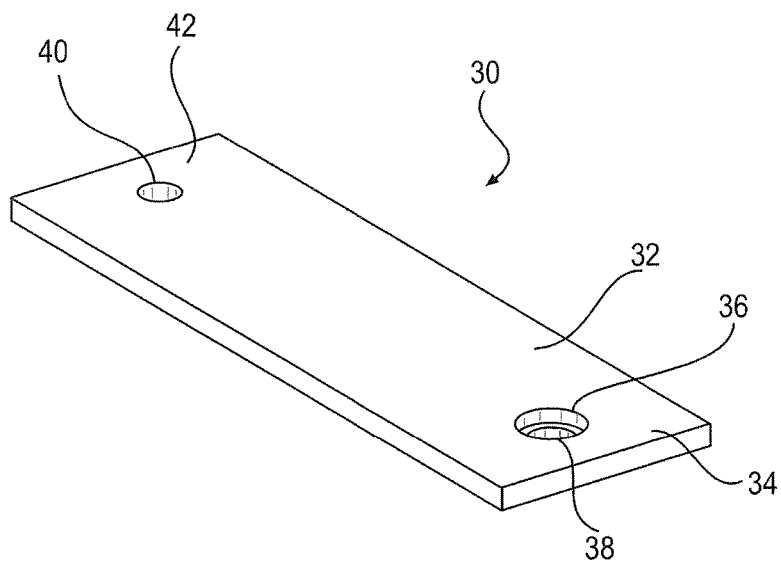
FIG. 4 is a perspective view of a further example of a fishing tool described herein.

The invention described herein is a mounting tool used to place a retainer disc safely and easily onto a hook to thereby secure a trailer hook onto a spinning bait hook. This fishing tool kit includes the fishing tool that has an installation hole on one end, with the kit further including one or more hook retainer discs. Each of these kit components will be discussed in more detail.

The tool itself includes a handle with a mounting end at one end or side of the handle. The handle may be about 6 inches in length, or alternatively about 4 to 8 inches in length, or still further alternatively about 2 to 18 inches in length. The handle can be approximately ½ inch wide, or alternatively about ⅜ to 1 inch wide, or still further alternatively about ¼ to 3 inches in width. The thickness of the handle is typically about ⅛ of an inch, or alternatively about 3/16 to ¼ of an inch. The foregoing dimensions are all with reference to the typical example of the tool in a generally rectangular shape. See FIGS. 1-3.

Referring specifically now to FIGS. 1-3, the fishing tool 10 includes a handle in the shape of a generally rectangular stick 12 having a mounting end 14 and an opposite end 22. The mounting end 14 includes a hole 16 therein that extends through the thickness of the stick 12. The hole 16 includes a recessed seat 18 in the hole and around the entire inside perimeter of the hole. The fishing tool 10 also has a keyring hole 20 on the opposite end 22 from the mounting end 14. Finally, there is a longitudinal indent 24 which is simply a cosmetic feature of the stick 12. As best shown in FIG. 3, the hole 16 extends through the entire thickness 15 of the stick 12. The seat 18 is a smaller diameter hole that creates the seat.

Figure 5:
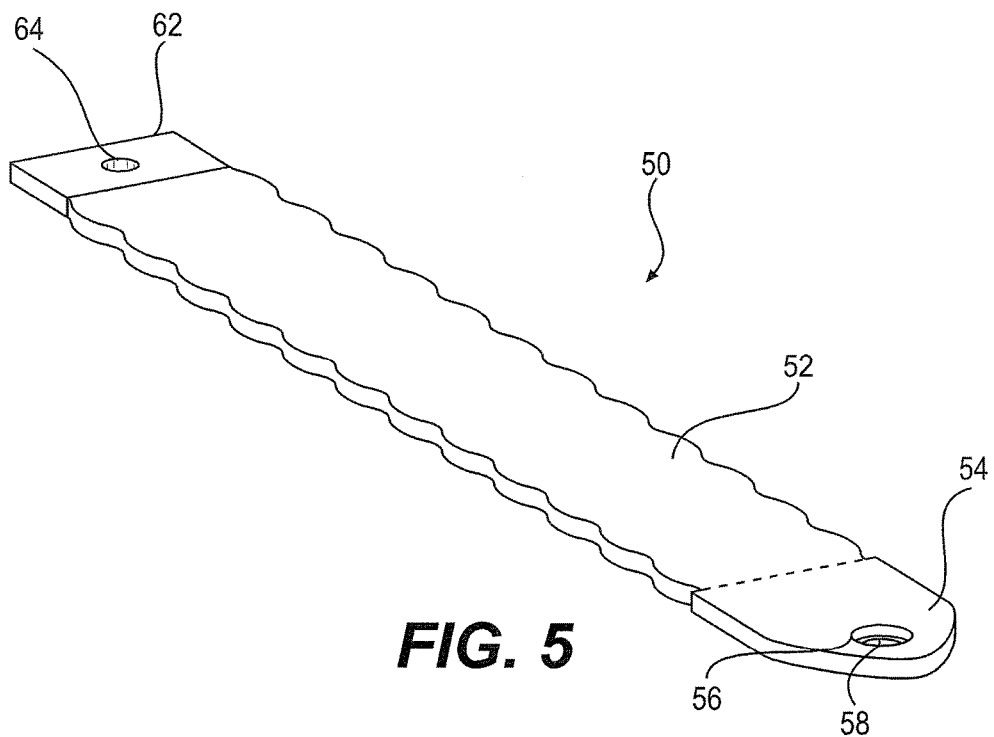
FIG. 5 is a perspective view of another alternative example of a fishing tool described herein.
Figure 6:
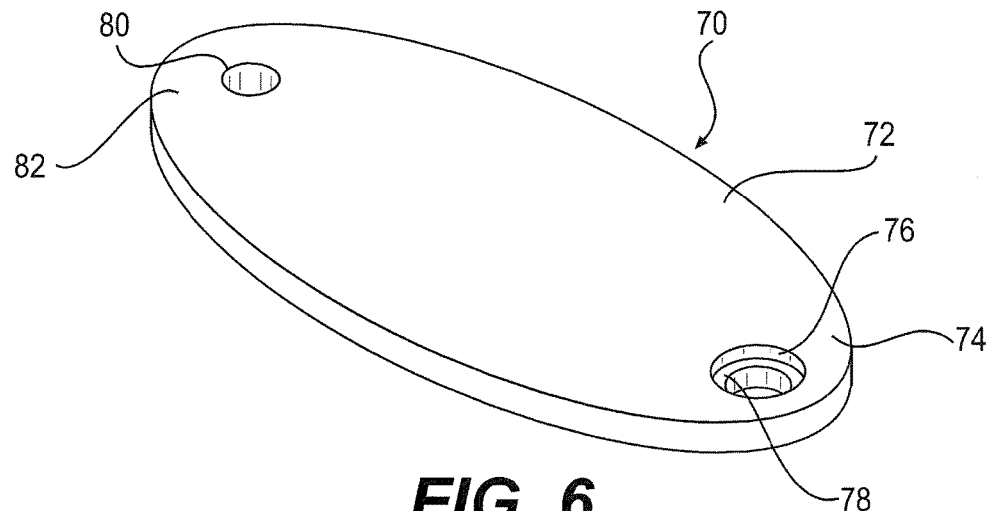
FIG. 6 is a perspective view of another alternative example of a fishing tool described herein.
Figure 7:
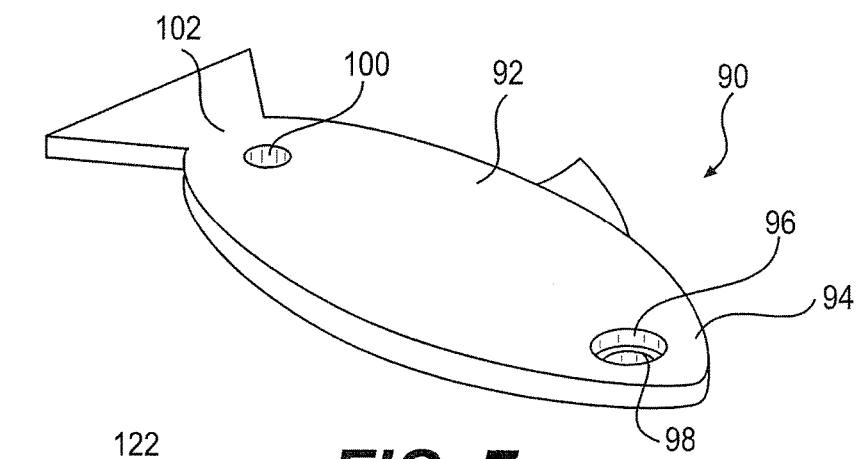
FIG. 7 is a perspective view of another alternative example of a fishing tool described herein.
Figure 8:
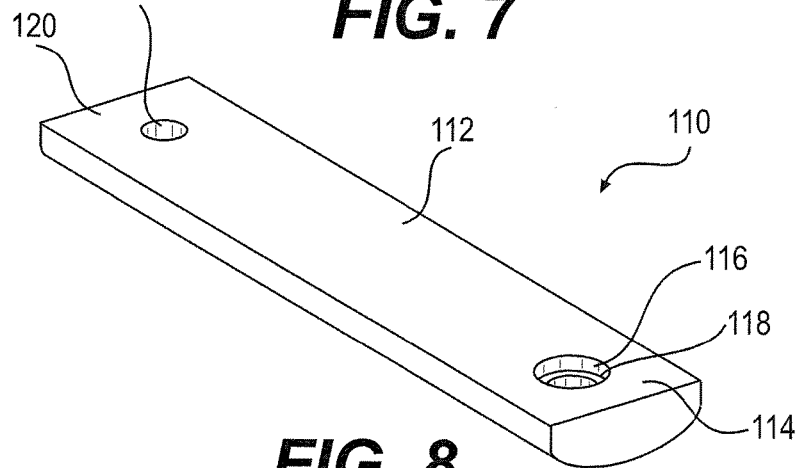
FIG. 8 is a perspective view of another alternative example of a fishing tool described herein.

As also demonstrated in the attached FIGS. 1 to 8, the tool may have many different shapes. In each case, there is a mounting end or side proximate an edge of the tool and around the installation hole. In addition to the generally rectangular tool of FIGS. 1-3 and FIG. 4 other shapes include a stick having a semi-round cross-section (FIG. 8). There may be an oval or circular tool (FIG. 6). The tool may be in the fanciful silhouette of a fish (FIG. 7). Preferably, there is a flat surface adjacent the mounting end of the tool and around the installation hole. It is envisioned that personalized indicia or brand trademarks and logos may be printed on the tool to increase the consumer interest in the product.

Turning now to FIGS. 4-8 specifically, FIG. 4 illustrates a fishing tool 30 that is a rectangular shaped stick 32. This stick 32 could be, for instance, a ruler to measure the length of a fish that is caught. In any event, the stick 32 has a mounting end 34 and an opposite end 42. The installation hole 32 includes a perimeter seat 38 therein. The installation hole 36 extends through the stick 32. A keyring hole 40 is in the opposite end 42 of the stick 32.

FIG. 5 illustrates a fishing tool 50 that includes a stick 52 having ribbed sides for easy gripping or other ornamental effects. The mounting end 54 includes installation hole 56 with a perimeter seat 58 therein. A keyring hole 64 extends through the opposite end 62 of the stick 52.

FIG. 6 illustrates a fishing tool 70 that includes an oval stick 72. The mounting end 74 of the stick 72 includes a hole 76 and a seat 78 around the perimeter of the hole 76. The opposite end 82 of the stick 72 includes a keyring hole 80.

FIG. 7 illustrates a fishing tool 90 having a fish-shaped stick 92. The mounting end 94 includes a hole 96 through the stick 92. A recessed seat 98 is positioned in the hole 96. On the opposite end 102 of the stick 92 there is a keyring hole 100.

FIG. 8 illustrates a fishing tool 110 having a rounded cross-section stick 112. On the mounting end 114 there is a hole 116 that includes a recessed seat 118 around the perimeter inside thereof. On the opposite end 120 of the stick 112 there is a keyring hole 122.

The tool may be manufactured from any relatively rigid material. The materials include steel, aluminum, alloys, plastic, wood, ceramic, composites and laminates of one or more of the foregoing. Because the tool will likely be used in a wet or moist environment, the material is preferably coated or painted so that it will not rust or degrade rapidly. The mounting end or side of the tool defines a hole and a recessed seat partially through the thickness of the tool. The tool surface around the hole is generally flat.

The hole can be round or square or oval or any other shape. It is necessary that the hole is big enough for the barb of a hook to stick through. Additionally, the hole needs to be configured in the tool proximate a side or end edge of the tool so that the barb of the hook can freely move in and out of the hole of the tool. The recessed seat is a ledge or shoulder that extends all around the inside perimeter of the installation hole. The recessed seat may or may not have the same shape as the larger hole. The recessed seat around the hole may have the same shape as the hole, for instance round, square, oval, star or any other shape. Alternatively, the recessed seat may define an alternative shape—e.g. a star-shaped hole with a round seat configured therein.

A plastic disc is used as a retainer tab. The outside diameter or circumferential edge of the disc has substantially the same shape as the installation hole. Preferably, the outside diameter or circumference of the disc is approximately the same or slightly larger than the dimensions of the hole so that the plastic disc may be retained by way of friction fit on the recessed seat. The disc may be round, square, oval, star or any preferred shape. The recessed seat may have the same shape as the retainer tab disc. FIGS. 13A-D illustrate alternative hole shapes with the matching plastic disc retainer to be seated in each hole. FIGS. 13A-D illustrate square (diamond), star, triangle and hexagon shapes as non-limiting examples of the hole and tab shapes.

The plastic disc may have a thickness of 0.03 inches, or alternatively 0.01 to 0.06 inches, or still further alternatively 0.01 to 0.08 inches. The plastic disc is made of a soft enough material for a hook to pass through it, yet durable enough that it can retain a trailer hook on a bait hook. Typically, the material is a polyethylene (including for instance a LDPE), polypropylene, polyvinylchloride, polyester, rubber, or elastomer material. The plastic disc may be clear or colored or ornamented in some way. For instance, the plastic disc may have a brand logo printed thereon. Still further, the printed indicia on the plastic disc may visually interact with a design optionally printed on the surface of the tool.

Figure 9A:
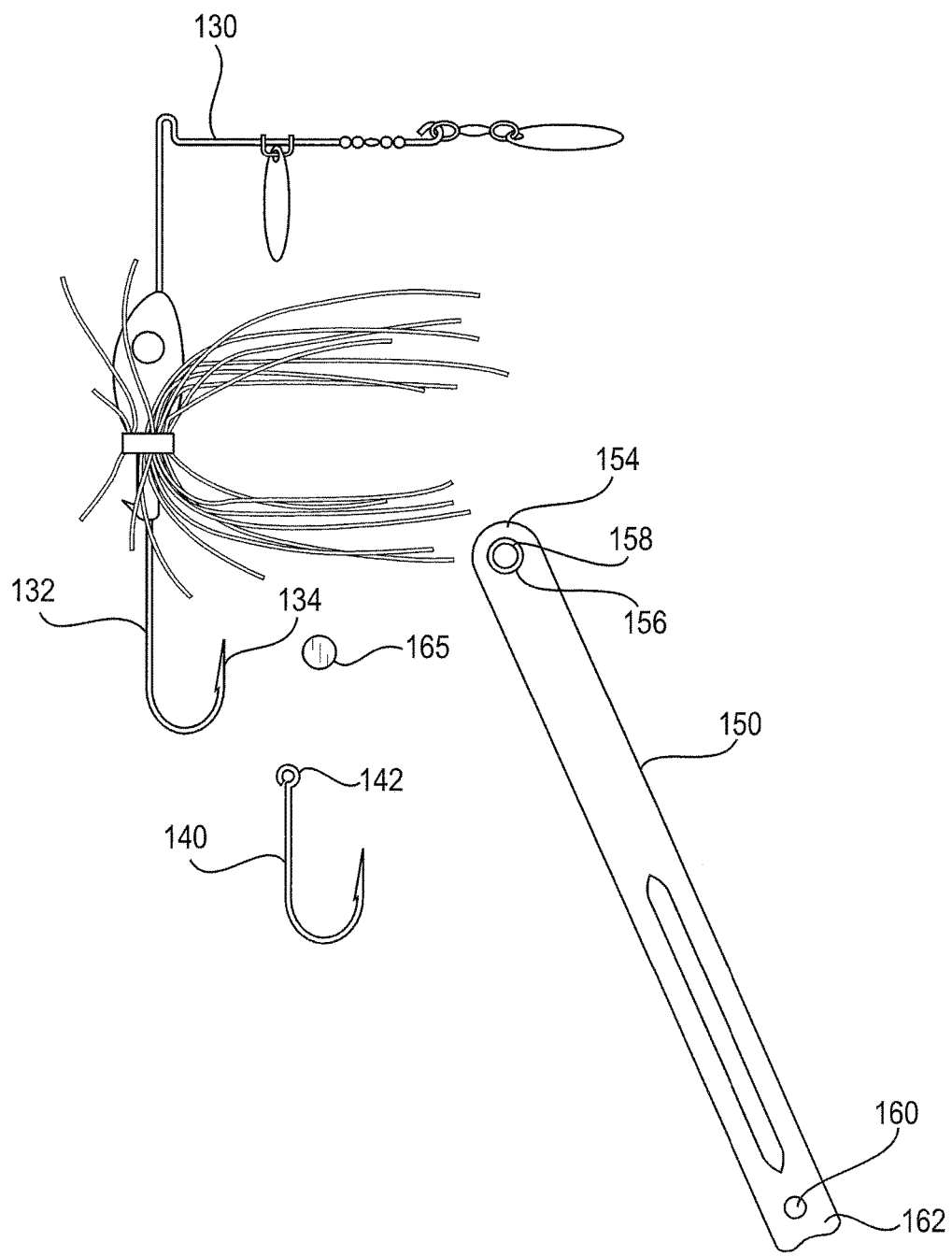
FIGS. 9A-C illustrates the method of installing a plastic disc retainer on a hook to secure a trailer hook on that first hook as described herein.
Figure 9B:
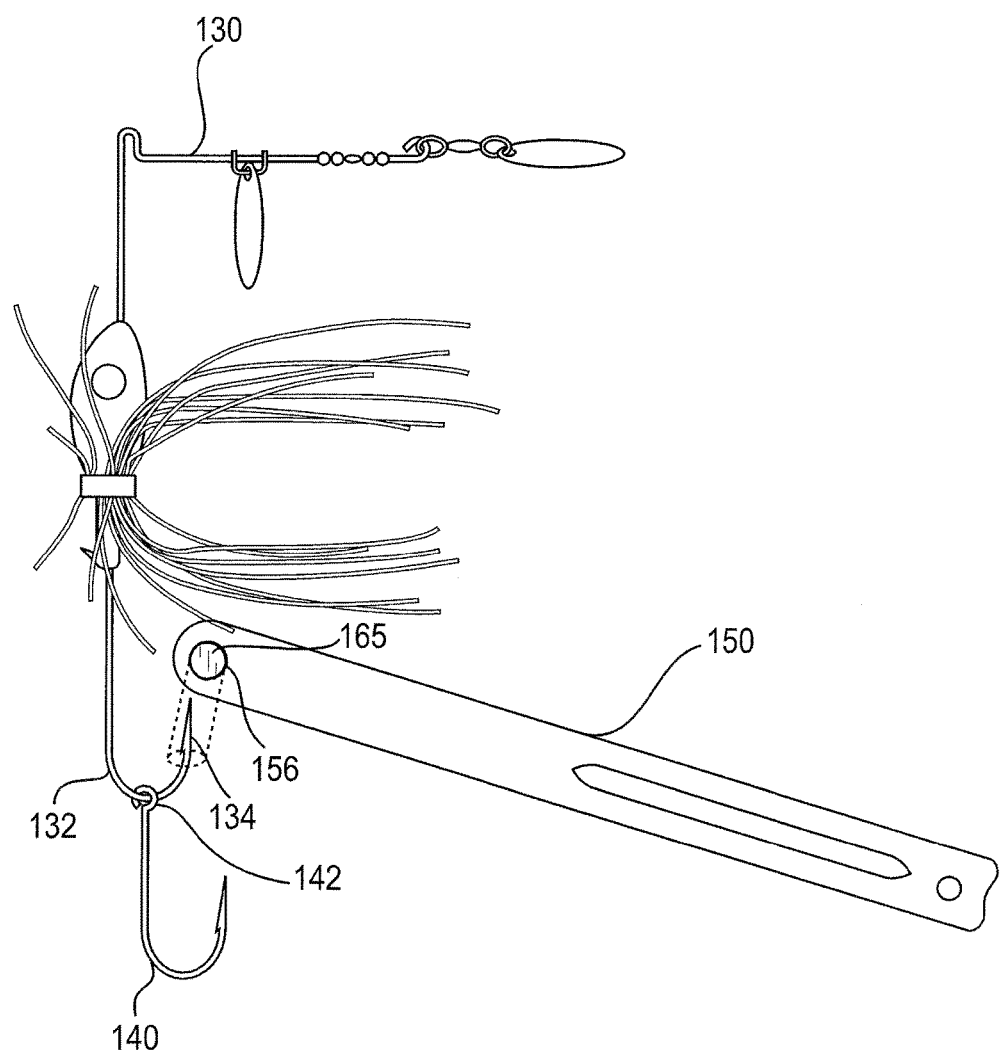
Figure 9C:
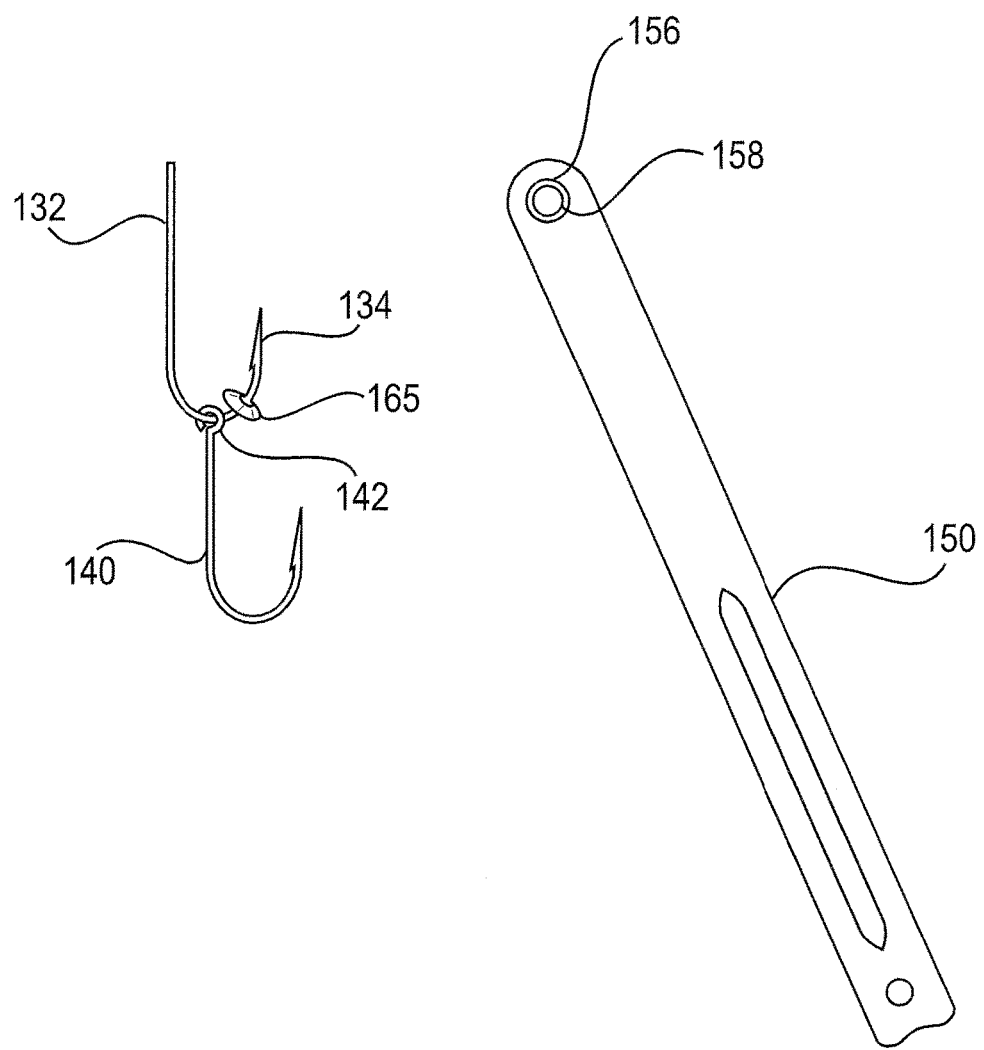

FIGS. 9A-C demonstrate the method of use of the mounting tool. Any first hook, for instance a spin bait hook, is held in one hand. A trailer hook eyelet is placed around the hook and onto the first bait hook. Next, a plastic disc is placed into the seat at the mounting end of the tool. That disc is then placed over the barb of the bait hook and pressed over it so that the bait hook pierces the plastic disc. The plastic disc has a diameter and dimension that is enough to retain the trailer hook on the bait hook. Preferably, the plastic disc is made of a material that is able to be easily snipped or torn off the bait hook by a fisherman. This way, the trailer hook can be removed and either a new trailer hook is mounted on the bait hook or the trailer hook is hooked on a different bait hook.

Referring specifically to FIGS. 9A-C, a fishing tool 150 includes a mounting end 154, an installation hole 156 and a recessed seat 158 therein. The opposite end 162 includes a keyring hole 160. A spin bait 130 includes a bait hook 132 having a barb 134. A plastic disc 165 is positioned inside the installation hole 156. A trailer hook 140 includes an eyelet 142. The eyelet is placed over the barb 134 of the bait hook 132. The plastic disc retainer 165 is then pressed over the barb 134 using the tool 150. The tool can then be pulled away from the hook 132 leaving the plastic disc retainer 165 thereon.

FIGS. 9A-C demonstrate the securing of a trailer hook onto a spin bait lure. Of course the tool may be used to secure an item on multiple alternative lure baits. Moreover, the figures primarily demonstrate the securement of a trailer hook. The tool herein can secure the retainer disc onto a hook to secure any desired item such as a lure component on a hook. For instance, a spinner or other lure teaser can be secured on a single or treble hook by pressing the retainer tab onto the hook after placing a first item over the hook as exemplified by the trailer hook herein.

Figure 10:
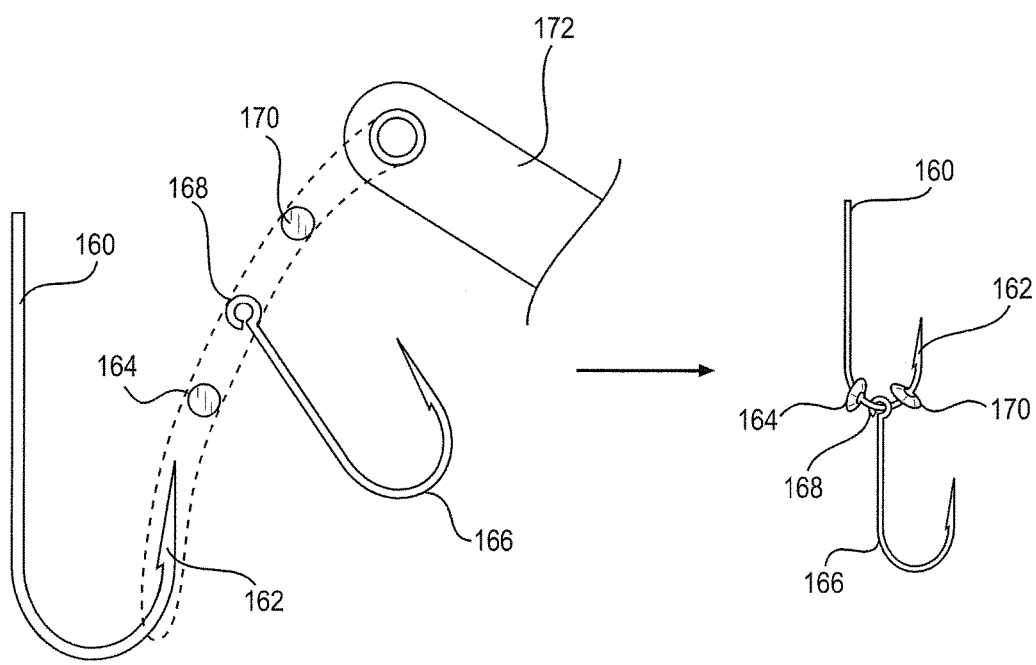
FIG. 10 is an alternative demonstration of the installation of a trailer hook on a first hook as described herein.
Figure 11:
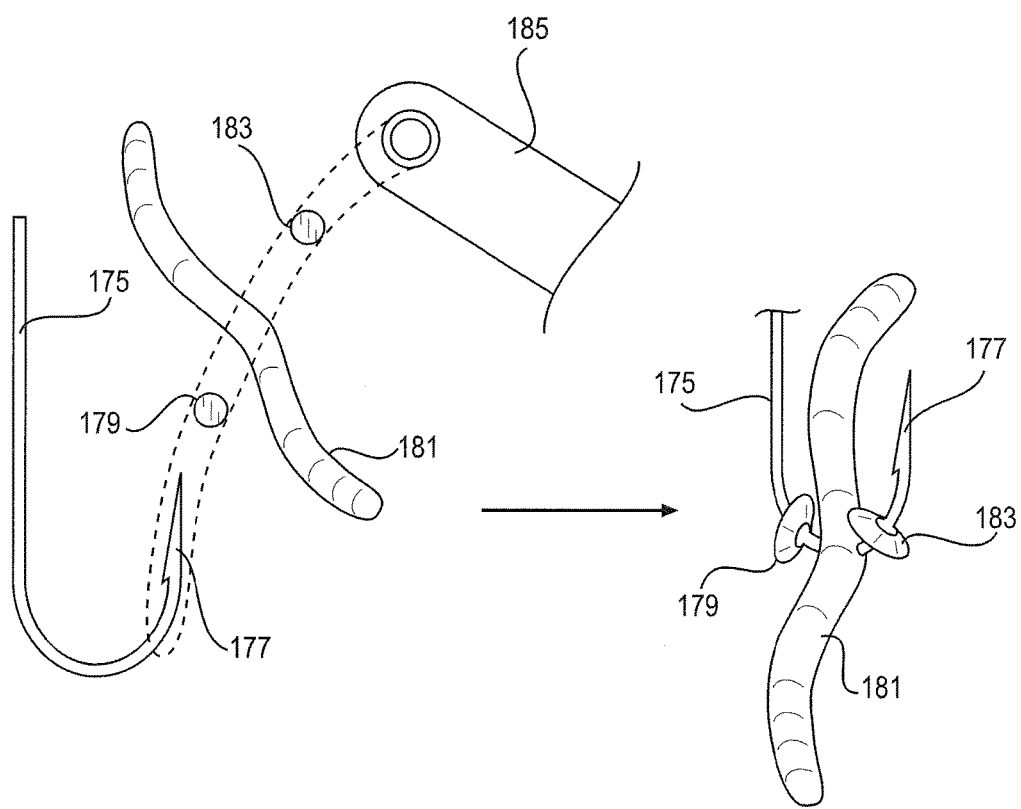
FIG. 11 is a perspective view of an artificial plastic worm as installed on a fish hook as described herein.

FIGS. 10 and 11 illustrate similar uses of an installation tool. In FIG. 10, a first hook 160 having a barb 162 thereon has a first plastic disc 164 pressed onto it using the tool 172. Then the eyelet 168 of a second hook 166 is placed over the barb 162. Then a second plastic disc 170 retainer is installed over the barb 162 and positions the second hook 166, typically a trailer hook, exactly where the fisherman wants it along the first hook.

In a second example in FIG. 11, a first hook 175 having a barb 177 has a first plastic disc 179 retainer installed thereon. Next, an artificial worm 181 is placed on the hook 175. Then a second plastic disc 183 is positioned on the opposite side of the plastic worm 181 to secure it in a particular location on the first hook 175.

Figure 12:
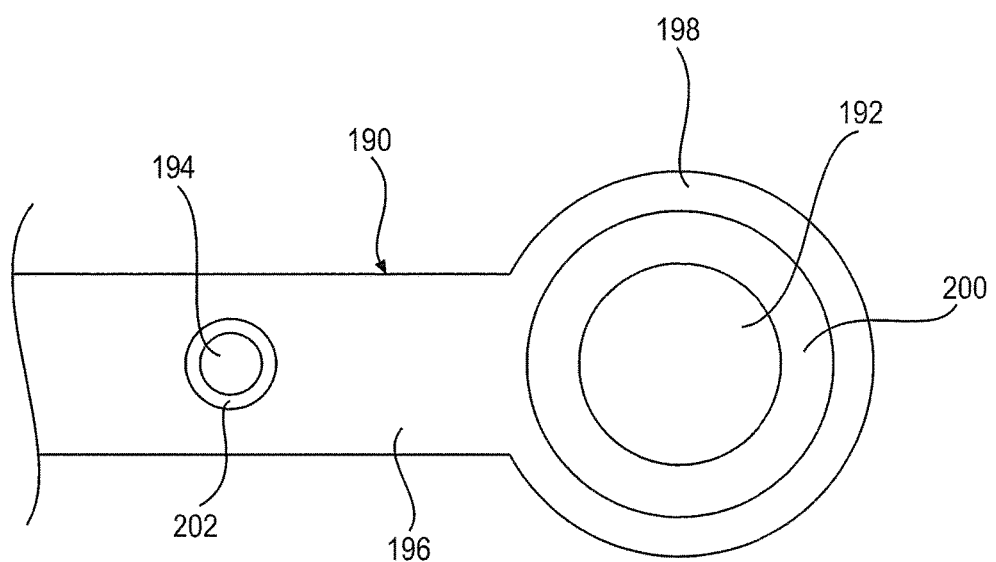
FIG. 12 is a top view of a further alternative of a fishing tool described herein.

FIG. 12 illustrates yet a further embodiment of the fishing tool 190 that includes two different sized holes 192 and 194 on the mounting end 196 thereof. At the distal portion 198 of the mounting tool 190 there is a large opening 192 with a large seat 200 to accommodate a relatively larger plastic disc retainer therein. This might be imagined for use with larger hooks and salt water tackle. Adjacent the larger hole 192 is the smaller hole 194 for accommodating a smaller plastic disc retainer. This smaller hole might be envisioned for use with fresh water tackle. Examples herein are shown of fishing tools having one or two installation holes therein. It is possible for three or more holes to be configured in a fishing tool, typically to accommodate different sized hooks that may be used for given fishing situations.

Other embodiments of the present invention will be apparent to those skilled in the art from consideration of the specification. It is intended that the specification and Figures be considered as exemplary only, with a true scope and spirit of the invention being indicated by the following claims.

The invention claimed is:

1. A fishing tool system for securing a lure component on a bait hook, the system comprising a fishing tool, the tool consisting essentially of a handle having a mounting end positioned therein, wherein the mounting end includes an installation hole that extends through the handle and a recessed seat in the installation hole and around an entire inside perimeter of the installation hole on one side of the fishing tool, and further comprising a plastic disc that has an outside diameter that corresponds to a diameter of the installation hole such that the plastic disc is positioned within the installation hole and the system further comprising the bait hook, such that the tool is configured to attach the plastic disc to the bait hook.

2. The fishing tool system as described in claim 1, wherein the installation hole is round in shape.

3. The fishing tool system as described in claim 1, wherein the installation hole has a shape selected from the group consisting of, rectangular, triangular, star, hexagonal and octagonal.

4. The fishing tool system as described in claim 2, wherein the recessed seat is round in shape.

5. The fishing tool system as described in claim 1, further comprising a plurality of installation holes in the handle and extending through the handle and each having a recessed seat therein.

6. The fishing tool system as described in claim 5, wherein each of the plurality of installation holes is round in shape.

7. The fishing tool system as described in claim 6, wherein each of the plurality of installation holes is different in size from the other installation holes.

8. The fishing tool system as described in claim 1, wherein the installation hole and plastic disc are round in shape.

9. The fishing tool system as described in claim 1, wherein the plastic disc is made of polyethylene.

10. The fishing tool system as described in claim 1, wherein the plastic disc has printed indicia thereon.

\* \* \* \* \*